United States Patent
Chi et al.

(10) Patent No.: US 9,500,892 B2
(45) Date of Patent: Nov. 22, 2016

(54) LIQUID CRYSTAL MODULE AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Hai Chi, Beijing (CN); Zhidan Zhang, Beijing (CN); Hao Zhou, Beijing (CN); Qing Ma, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 81 days.

(21) Appl. No.: 14/417,759

(22) PCT Filed: May 6, 2014

(86) PCT No.: PCT/CN2014/076853
§ 371 (c)(1),
(2) Date: Jan. 27, 2015

(87) PCT Pub. No.: WO2015/070575
PCT Pub. Date: May 21, 2015

(65) Prior Publication Data
US 2016/0018689 A1   Jan. 21, 2016

(30) Foreign Application Priority Data

Nov. 12, 2013 (CN) .......................... 2013 1 0560062

(51) Int. Cl.
*G02F 1/1333* (2006.01)
*G02F 1/1335* (2006.01)

(52) U.S. Cl.
CPC ... *G02F 1/133308* (2013.01); *G02F 1/133608* (2013.01); *G02F 2001/133317* (2013.01); *G02F 2001/133325* (2013.01); *G02F 2201/465* (2013.01); *G02F 2201/54* (2013.01)

(58) Field of Classification Search
CPC .................. G02F 1/133308; G02F 1/133608; G02F 2201/54; G02F 2001/133325; G02F 2201/465; G02F 2001/133317
See application file for complete search history.

(56) References Cited

U.S. PATENT DOCUMENTS

2001/0050731 A1   12/2001   An et al.

FOREIGN PATENT DOCUMENTS

CN           1629694 A      6/2005
CN         101545601 A      9/2009
(Continued)

OTHER PUBLICATIONS

First Office Action of Chinese Application No. 201310560062.3, dated Jul. 28, 2015. Translation provided by Dragon Intellectual Property Law Firm.
(Continued)

*Primary Examiner* — Donald Raleigh
*Assistant Examiner* — Kevin Quarterman
(74) *Attorney, Agent, or Firm* — Harness, Dickey & Pierce, P.L.C.

(57) ABSTRACT

The present disclosure provides a liquid crystal module and a display device. The liquid crystal module includes a liquid crystal screen and a backlight module. It further includes a side bezel for assembling the backlight module. The side bezel includes a first portion surrounding both sides of the backlight module and a second portion bent inwardly between the liquid crystal screen and the backlight module, and the second portion is provided with a connection structure for connecting and assembling the liquid crystal screen. According to the present disclosure, the bezel-free liquid crystal module, i.e., the liquid crystal screen without any frame or cover, will be provided by means of the connection structure. As a result, it is able to provide an attractive appearance and a simple structure, thereby to provide a user with a perfect and wide visual effect.

16 Claims, 2 Drawing Sheets

(56) References Cited

FOREIGN PATENT DOCUMENTS

| CN | 101865434 | A | | 10/2010 |
|---|---|---|---|---|
| CN | 102799000 | A | | 11/2012 |
| CN | 102799002 | A | | 11/2012 |
| CN | 102809834 | A | | 12/2012 |
| CN | 202720414 | U | | 2/2013 |
| CN | 202720414 | U | * | 2/2013 |
| CN | 102981294 | A | | 3/2013 |
| CN | 202995186 | U | | 6/2013 |
| CN | 203010406 | U | | 6/2013 |
| CN | 103558707 | A | | 2/2014 |
| JP | 2007298699 | A | | 11/2007 |
| JP | 2008251220 | A | | 10/2008 |

OTHER PUBLICATIONS

Written Opinion of the International Searching Authority for international application No. PCT/CN2014/076853.

* cited by examiner

LIQUID CRYSTAL MODULE AND DISPLAY DEVICE

CROSS-REFERENCE TO RELATED APPLICATIONS

The present application is the U.S. national phase of PCT Application No. PCT/CN2014/076853 filed on May 6, 2014, which claims priority to the Chinese application No. 201310560062.3 filed on Nov. 12, 2013, the entire contents of which are incorporated herein by reference.

TECHNICAL FIELD

The present disclosure relates to the field of liquid crystal display technology, in particular to a bezel-free liquid crystal module and a display device.

BACKGROUND

Recently, along with the rapid development of display technologies, various display devices, e.g., mobile phones, digital cameras, laptop PCs, Ultrabooks, Pads, PCs, and TVs, have been widely used in, and become an indispensable part of, our daily lives. A liquid module is an important part of these devices, and there is an increasing demand on the appearance and style of the liquid crystal module. The appearance of the liquid crystal module directly depends on a bezel width thereof, so it is a development trend in the display field to provide the liquid crystal module with a narrow bezel.

As shown in FIG. 1, usually the liquid crystal module includes a liquid crystal screen 1, a bezel 2, a backlight module 3, etc. The liquid crystal screen 1 is mounted on the backlight module 3, covered by the bezel 2 from above and then fixed together therewith. Hence, when viewed from a front side of the liquid crystal module, the liquid crystal screen 1 is surrounded by the wide, black bezel. As a result, an image will be adversely affected when a viewer is watching TV.

SUMMARY

An object of the present disclosure is to provide a liquid crystal module and a display device, so as to provide a bezel-free design, i.e., a liquid crystal screen without any frame or cover.

In one aspect, the present disclosure provides a liquid crystal module, including a liquid crystal screen and a backlight module. It further includes a side bezel for assembling the backlight module. The side bezel includes a first portion surrounding both sides of the backlight module and a second portion bent inwardly between the liquid crystal screen and the backlight module, and the second portion is provided with a connection structure for connecting and assembling the liquid crystal screen.

Further, the liquid crystal screen includes a display region and a non-display region arranged at a periphery of the display region, and the connection structure is connected to a first side of the non-display region of the liquid crystal screen facing the backlight module.

Further, the liquid crystal module includes an optical membrane arranged between the display region of the liquid crystal screen and the backlight module. The backlight module includes a backlight source light-emitting region corresponding to the display region of the liquid crystal screen, and a back plate. The back plate includes a first portion arranged at a periphery of the backlight source light-emitting region and a second portion bent inwardly to support the optical membrane. The side bezel is fixed onto the first portion of the back plate.

Further, the connection structure includes a snap, which includes: a first connection section adhered onto the first side of the liquid crystal screen; and a second connection section having a slot engaged with the second portion of the side bezel.

Further, the first connection section is arranged parallel to the liquid crystal screen and the second connection section is arranged in perpendicular to the first connection section, and the first connection section and the second connection section form an inverted-L structure.

Further, the second portion of the back plate is provided with a protrusion formed by punching and configured to locate the optical membrane.

Further, the protrusion partitions the second portion of the back plate into a first region for supporting the optical membrane and a second region located below the snap.

Further, a via-hole is provided at an edge of the optical membrane, and the protrusion passes through the via-hole so as to fix the optical membrane.

Further, a gap is provided between the optical membrane and an end of the second portion of the side bezel.

Further, an elastic connector is provided between the protrusion and the liquid crystal screen.

In another aspect, the present disclosure provides a display device including the above-mentioned liquid crystal module.

The present disclosure has the following advantageous effect. The bezel-free liquid crystal module, i.e., the liquid crystal screen without any frame or cover, will be provided by means of the connection structure. As a result, it is able to provide an attractive appearance and a simple structure, thereby to provide a user with a perfect and wide visual effect.

DETAILED DESCRIPTION

The structure and principle of the present disclosure will be described hereinafter in conjunction with the drawings. The following embodiments are for illustrative purposes only, but shall not be used to limit the scope of the present disclosure.

Figure 1:
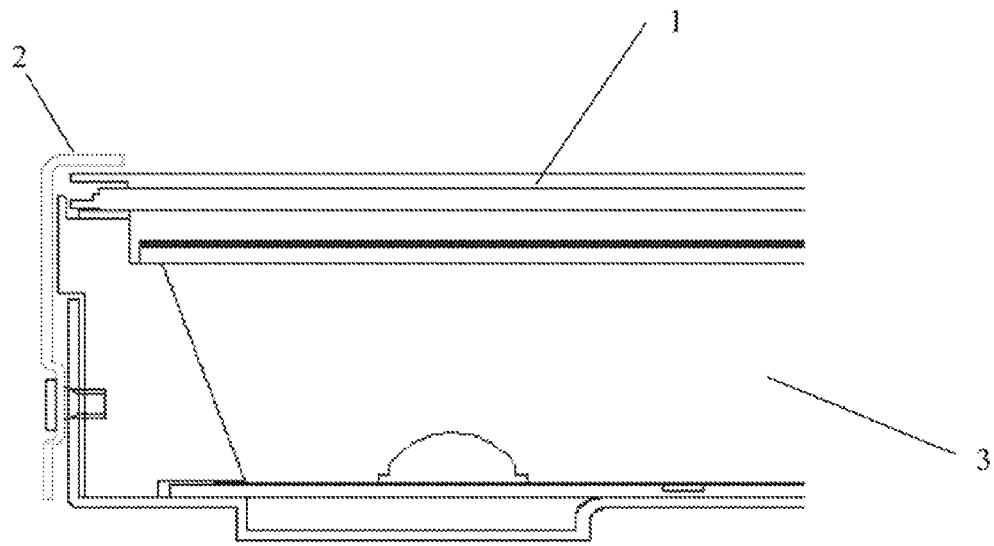
FIG. 1 is a schematic view showing an existing liquid crystal module.
Figure 2:
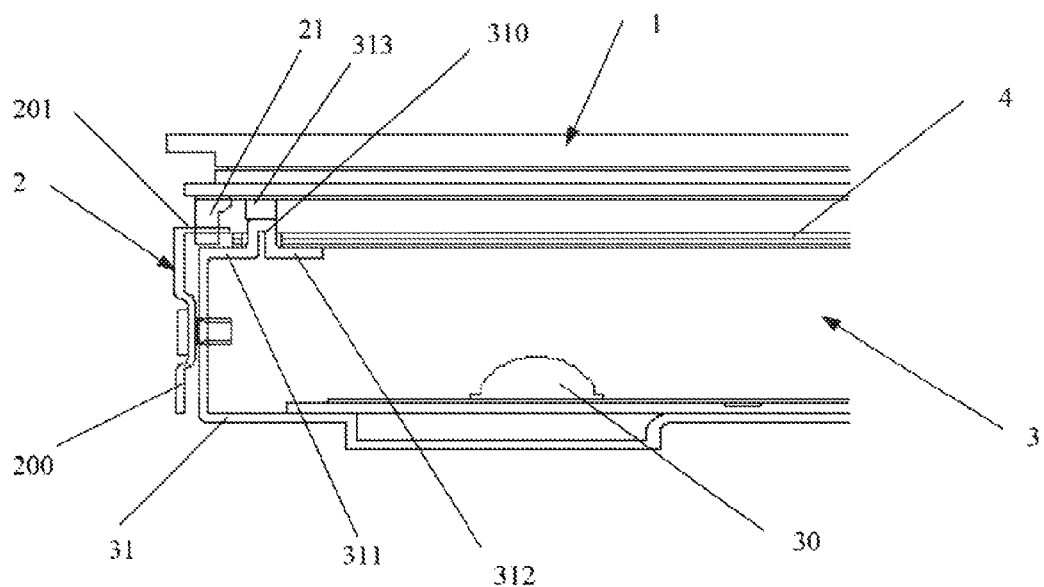
FIG. 2 is a schematic view showing a liquid crystal module according to one embodiment of the present disclosure.

As shown in FIG. 2, a liquid crystal module of the present disclosure includes a liquid crystal screen 1 and a backlight module 3. It further includes a side bezel 2 for assembling the backlight module 3. The side bezel 2 includes a first portion 200 surrounding both sides of the backlight module 3 and a second portion 201 bent inwardly between the liquid crystal screen 1 and the backlight module 3, and the second portion 201 is provided with a connection structure for connecting and assembling the liquid crystal screen 1.

In this embodiment, the connection structure for connecting the liquid crystal screen 1 and the backlight module 3 is arranged at the second portion 201 of the side bezel 2, the second portion 201 is arranged between the liquid crystal screen 1 and the backlight module 3. As a result, the bezel on the liquid crystal screen 1 will be omitted, and it is able to provide the bezel-free liquid crystal screen 1, thereby to improve a visual effect of a user.

The connection structure may include various forms, as long as it can be used to connect the liquid crystal screen 1 and the backlight module 3 without providing any cover on the liquid crystal screen 1 and affecting the display effect thereof. The connection structure used in this embodiment will be described hereinafter.

The liquid crystal screen 1 includes a display region and a non-display region arranged at a periphery of the display region, and the connection structure is connected to a first side of the non-display region of the liquid crystal screen 1 facing the backlight module 3.

The liquid crystal module further includes an optical membrane 4 arranged between the display region of the liquid crystal screen 1 and the backlight module 3. The backlight module 3 includes a backlight source light-emitting region corresponding to the display region of the liquid crystal screen 1, and a back plate 31. The back plate 31 includes a first portion arranged at a periphery of the backlight source light-emitting region and a second portion bent inwardly to support the optical membrane. The side bezel 2 is fixed onto the first portion of the back plate 31.

In this embodiment, the second portion 201 of the side bezel 2 is fixed onto the back plate 31 by means of a bolt.

Figure 3:
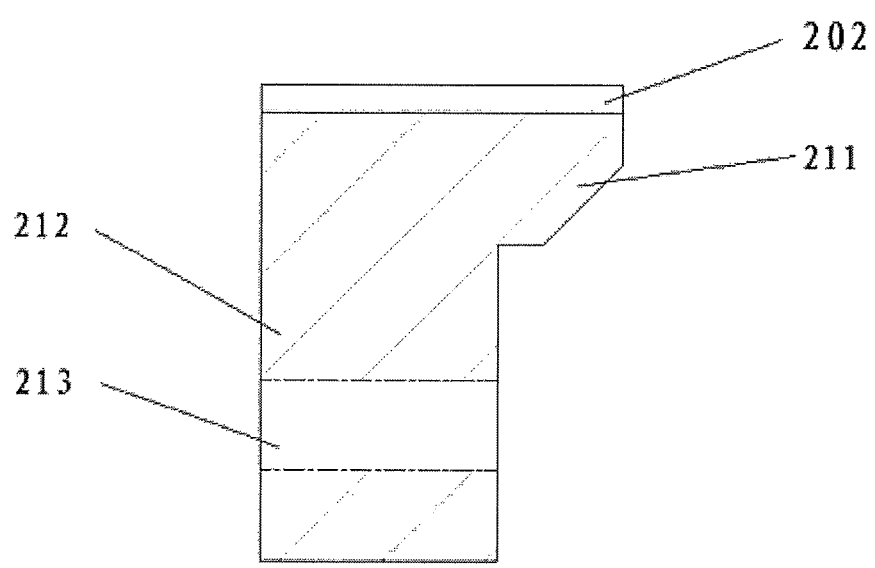
FIG. 3 is a schematic view showing a snap according to one embodiment of the present disclosure.

As shown in FIG. 3, the connection structure in this embodiment includes a snap 21, which includes a first connection section 211 adhered onto the first side of the liquid crystal screen 1, and a second connection section 212 having a slot 213 engaged with the second portion 201 of the side bezel 2.

The second portion 201 of the side bezel 2 is inserted into the slot 213, so as to connect the liquid crystal screen 1 and the backlight module 3.

In this embodiment, the snap 21 is adhered onto an edge of the liquid crystal screen 1 (the non-display region), so as to ingeniously hide an upper bezel of an existing liquid crystal screen 1 within a lower end of the liquid crystal screen 1 (i.e., between the liquid crystal screen 1 and the backlight module 3), thereby to fix the liquid crystal screen 1 onto the backlight module 3 by means of the snap 21. As a result, it is able to provide the bezel-free liquid crystal screen 1, thereby to provide the user with a perfect, wide visual effect. The bezel-free liquid crystal module of the present disclosure is of an attractive appearance and a simple structure, as well as an excellent display effect.

The first connection section 211 is arranged parallel to the liquid crystal screen 1, and the second connection section 212 is arranged in perpendicular to the first connection section 211 and forms an inverted-L structure therewith.

The first connection section 211 is adhered to the first side of the non-display region of the liquid crystal screen 1 facing the backlight module 3 by means of an adhesion layer 202 formed by glue. As a result, it is able to prevent the liquid crystal screen 1 from being damaged by the first connection section 211.

In this embodiment, the back plate 31 includes the second portion for supporting the optical membrane 4, and the second portion of the back plate 31 is provided with a protrusion 310 formed by punching and configured to locate the optical membrane 4.

In this embodiment, the protrusion 310 partitions the second portion into a first region 312 for supporting the optical membrane 4 and a second region 311 located below the snap 21.

In order to fix the optical membrane 4 in a better manner, a via-hole is provided at an edge of the optical membrane 4, and the protrusion 310 passes through the via-hole so as to fix the optical membrane 4.

In this embodiment, in order to prevent the liquid crystal screen from being damaged due to a collision between the protrusion 310 and the liquid crystal screen, an elastic connector 313 is provided between the protrusion 310 and the liquid crystal screen. The elastic connector is preferably a silica gel pad, which functions as to cushion the collision between the protrusion 310 and the liquid crystal screen, thereby to prevent the liquid crystal screen from being damaged.

A gap is provided between the optical membrane 4 and an end of the second portion 201 of the side bezel 2.

In this embodiment, the backlight module 3 may be a direct-type or an edge-type one. A LED lamp 30 is provided in the backlight source light-emitting region of the backlight module 3.

The present disclosure further provides a display device including the above-mentioned liquid crystal module.

The above are merely the alternative embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A liquid crystal module, comprising a liquid crystal screen and a backlight module, wherein the liquid crystal module further comprises a side bezel for assembling the backlight module, the side bezel comprises a first portion surrounding both sides of the backlight module and a second portion bent inwardly between the liquid crystal screen and the backlight module, and the second portion is engaged with a connection structure for connecting and assembling the liquid crystal screen, wherein the liquid crystal screen comprises a display region and a non-display region arranged at a periphery of the display region, and the connection structure is connected to a first side of the non-display region of the liquid crystal screen facing the backlight module, the connection structure comprises a snap, and the snap comprises;

a first connection section adhered onto the first side of the liquid crystal screen; and a second connection section having a slot receiving the second portion of the side bezel.

2. The liquid crystal module according to claim 1, further comprising an optical membrane arranged between the display region of the liquid crystal screen and the backlight module, wherein the backlight module comprises a backlight source light-emitting region corresponding to the display region of the liquid crystal screen, and a back plate, and wherein the back plate comprises a first portion arranged at a periphery of the backlight source light-emitting region and a second portion bent inwardly to support the optical membrane, and the side bezel is fixed onto the first portion of the back plate.

3. The liquid crystal module according to claim 2, wherein a gap is provided between the optical membrane and an end of the second portion of the side bezel.

4. The liquid crystal module according to claim 1, wherein the first connection section is arranged parallel to the liquid crystal screen, and the second connection section is arranged in perpendicular to the first connection section, and the first connection section and the second connection section form an inverted-L structure.

5. The liquid crystal module according to claim 2, wherein the second portion of the back plate is provided with a protrusion formed by punching and configured to locate the optical membrane.

6. The liquid crystal module according to claim 5, wherein the protrusion partitions the second portion of the back plate into a first region for supporting the optical membrane and a second region located below the snap.

7. The liquid crystal module according to claim 5, wherein a via-hole is provided at an edge of the optical membrane, and the protrusion passes through the via-hole so as to fix the optical membrane.

8. The liquid crystal module according to claim 5, wherein an elastic connector is provided between the protrusion and the liquid crystal screen.

9. A display device comprising the liquid crystal module according to claim 1.

10. The display device according to claim 9, further comprising an optical membrane arranged between the display region of the liquid crystal screen and the backlight module, wherein the backlight module comprises a backlight source light-emitting region corresponding to the display region of the liquid crystal screen, and a back plate, and wherein the back plate comprises a first portion arranged at a periphery of the backlight source light-emitting region and a second portion bent inwardly to support the optical membrane, and the side bezel is fixed onto the first portion of the back plate.

11. The display device according to claim 10, wherein a gap is provided between the optical membrane and an end of the second portion of the side bezel.

12. The display device according to claim 9, wherein the first connection section is arranged parallel to the liquid crystal screen, and the second connection section is arranged in perpendicular to the first connection section, and the first connection section and the second connection section form an inverted-L structure.

13. The display device according to claim 10, wherein the second portion of the back plate is provided with a protrusion formed by punching and configured to locate the optical membrane.

14. The display device according to claim 13, wherein the protrusion partitions the second portion of the back plate into a first region for supporting the optical membrane and a second region located below the snap.

15. The display device according to claim 13, wherein a via-hole is provided at an edge of the optical membrane, and the protrusion passes through the via-hole so as to fix the optical membrane.

16. The display device according to claim 13, wherein an elastic connector is provided between the protrusion and the liquid crystal screen.

* * * * *